Dec. 21, 1954     B. W. POWERS     2,697,568
AIRCRAFT RUDDER CONTROL

Filed Feb. 2, 1949     3 Sheets-Sheet 1

Bradford W. Powers
*INVENTOR.*

BY *James M. Clark*

Dec. 21, 1954  B. W. POWERS  2,697,568
AIRCRAFT RUDDER CONTROL
Filed Feb. 2, 1949  3 Sheets-Sheet 2

Bradford W. Powers
*INVENTOR.*
BY *James M. Clark*

United States Patent Office 2,697,568
Patented Dec. 21, 1954

2,697,568

AIRCRAFT RUDDER CONTROL

Bradford W. Powers, San Diego, Calif., assignor to Consolidated Vultee Aircraft Corporation, a corporation of Delaware Application February 2, 1949, Serial No. 74,096

6 Claims. (Cl. 244—87)

The present invention relates broadly to the control and steering of aircraft in flight and more particularly to steering or rudder control systems and associated operating mechanisms for aircraft and similar vehicles.

This invention is directed primarily to improvements in rudder control means of the dual surface type and particularly to the wing tip rudder and vertical stabilizer surfaces of tailless type aircraft, as well as to the corresponding laterally spaced surfaces of multiple rudder empennages of the conventional tail type aircraft. These improvements include steering control mechanism by which such laterally spaced rudder control surfaces are differentially operated in the same direction for improved turning or steering characteristics of the airplane. The term "differential" as applied herein to the present systems will be understood to mean different angular deflections or displacements of the respective rudder surfaces. It should be kept in mind that the surfaces are deflected in the same general direction, i. e., both are simultaneously deflected to the right, or to the left, but such deflection in the same direction in the case of one surface may be several times the angular extent of the deflection of the other surface.

The improved operation of the present rudder surfaces is obtained by a simple control mechanism for obtaining the differential operation for use in conjunction with rudder pedals which may be of conventional construction. The present invention also includes an improved arrangement of the vertical steering surfaces and their adjacent fixed fins by which their combined profile and a forwardly converging or "toed-in" disposition with respect to the line of flight improves the directional stability of the airplane, while having minimum drag characteristics in flight.

It is, accordingly, a major object of the present invention to provide an improved rudder control system and operating mechanism for the steering of tailless aircraft and aircraft having dual rudder surfaces upon their empennages. It is a further object to provide an improved steering control system for laterally spaced rudders by which these surfaces are simultaneously moved to different angles of deflection, or setting, to obtain positive control moments and to thereby compensate for yawing and other flying conditions for maintaining both lateral stability and directional control. It is a further object of this invention to provide improved control mechanism for such systems, which mechanism is capable of automatically effecting such differential rudder angles of deflection with equal movements of the rudder pedals. It is a further and important object of the present invention to provide an improved "toed-in" relationship of movable and fixed cambered surfaces disposed at the lateral and opposite tips of a main, or auxiliary airfoil, such that the relationship provides both directional stability and offers minimum drag in flight. Further objects of this invention relate to the novel and improved relationship of the operating mechanism for the control surfaces with respect to the adjacent fixed airfoil surfaces, as well as to the details of the respective parts of the operating system.

Other objects and advantages of the present invention will become apparent to those skilled in the art after reading the present description when taken in conjunction with the accompanying drawings, forming a part hereof, in which.

Figure 1:
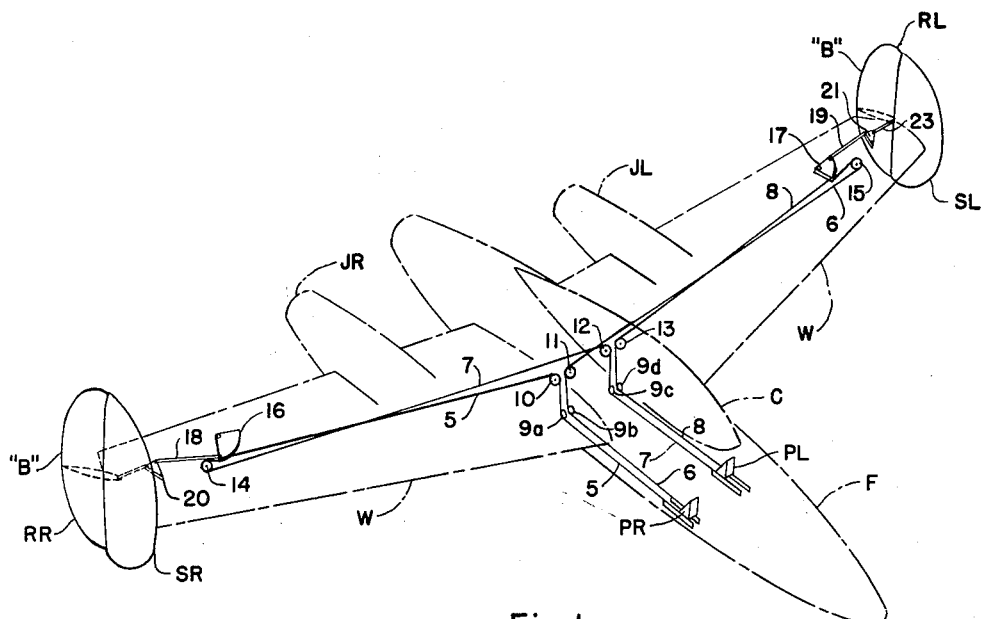
Fig. 1 is a perspective view of a tailless type aircraft in flight and to which certain of the present improvements have been applied.

Referring now to Fig. 1, the letter F represents the fuselage of an airplane of the tailless type having laterally extending sustaining surfaces or wings W. The fuselage is provided with a pilot compartment covered by a suitable cockpit canopy indicated by the letter C and the aircraft is propelled in flight by suitable power plants supported adjacent the trailing portions of the wings as indicated by the letters JR and JL. At the tips of each wing W there are disposed vertical stabilizers or fixed fin surfaces SR and SL, on the right and the left wing tips, respectively. Pivotally carried upon each wing tip, aft of the fixed fin surfaces, are the movable rudder control surfaces RR and RL, upon the right and left wing tips, respectively. The control or operating system for the rudder surfaces shown in Fig. 1, include the right and left rudder pedals PR and PL, to which are operatively connected the control cables 5, 6, 7 and 8. The cables 5 and 7 extend rearwardly over suitable sheaves 9a and 9c, 10 and 12, and laterally outwardly within the right wing W for the operation of the right rudder RR. The control cables 6 and 8 extend rearwardly over the sheaves 9b and 9d, 11 and 13, and laterally outwardly through the left wing W for the operation of the left rudder surface RL. The control cables 5 and 7 terminate in the quadrant or sector 16 which is pivotally mounted upon the aircraft structure for movement in a substantially horizontal plane, the cable 7 extending out and around the sheave 14. Similarly the cables 6 and 8 terminate at a corresponding quadrant or sector 17 similarly mounted for pivotal movement within the left wing with cable 6 extending outwardly and around the sheave 15. These elements of the control system are shown in greater detail in Figs. 2 and 3, with the exception of the rudder pedals PR and PL, which may otherwise be of conventional construction.

A push-rod 18 interconnects the quadrant 16 with a bell-crank or triangular lever element 20, also pivotally mounted upon the wing structure for movement in a substantially horizontal plane, and which in turn is pivotally interconnected by means of the link 22 with the leading edge portion of the right rudder RR. The rudder is pivotally mounted upon a suitable bracket on the wing tip structure W upon the vertical pivot axis 24, and is provided with a cut-away portion 26 to permit it to clear the wing support. Similarly the quadrant 17 is interconnected with a triangular bell-crank or lever element 21 by means of the push-rod 19 and the lever element 21 is in turn pivotally connected by the link 23 to the leading edge of the left rudder RL, which is similarly supported for controlled movement about the vertical axis of its hinge pin 25. The rudder RL is also provided with a cut-out portion 27 within its leading edge portion in order to permit deflections of the extent to which the right rudder RR has been displaced or moved in Fig. 3.

Figure 3:
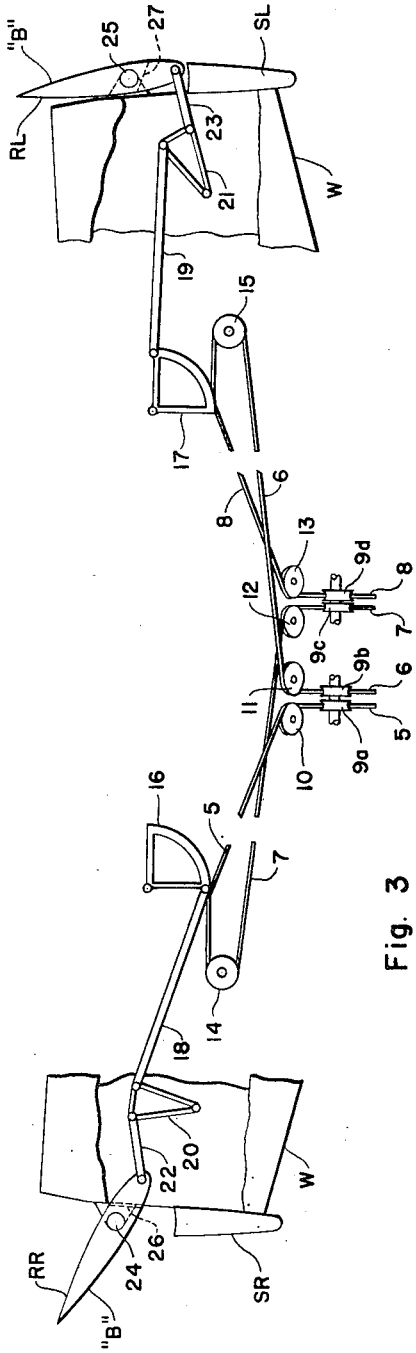
Fig. 3 is a similar view showing the surfaces and mechanism of Fig. 2 in a displaced position.
Figure 2:
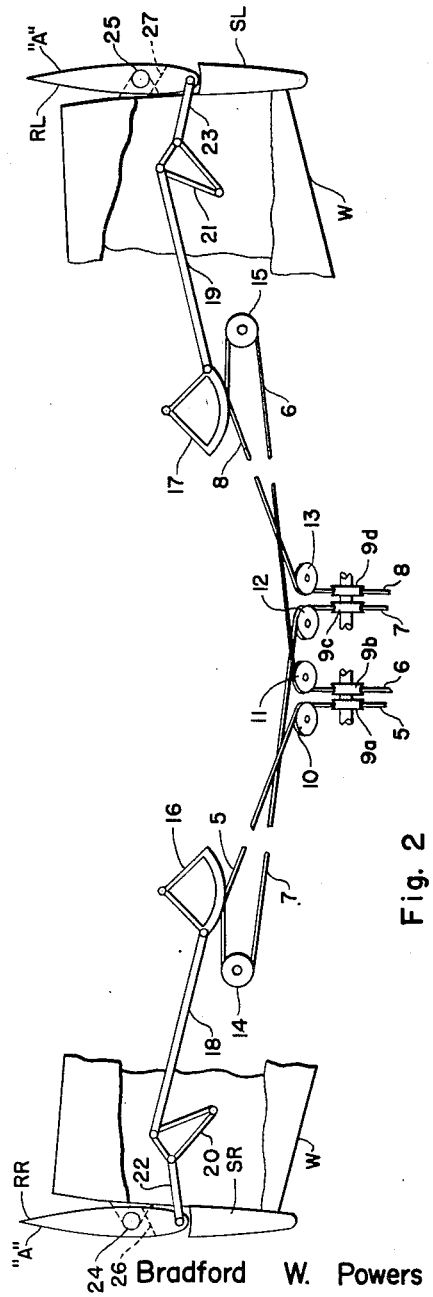
Fig. 2 is an enlarged plan view of the rudder control surfaces and operating mechanism as applied to the airplane shown in Fig. 1.

The operation of the improved rudder control system shown in Figs. 1, 2 and 3, is as follows:

During normal straight flight, the control surfaces RR and RL will be disposed in their neutral fore and aft aligned positions as indicated by the letters "A" in Fig. 2, in which position the rudder pedals PR and PL will also be in their neutral positions in which they will be laterally disposed one with respect to the other. Let it be assumed that it is desired to steer the airplane shown in Fig. 1 toward the right, or to the starboard, as viewed by the pilot of the airplane. (To the reader's left in Fig. 1.) The pilot then presses the right rudder pedal PR forwardly causing the simultaneous forward movement of the cables 5 and 6, and since these cables are connected at their outer ends to the corresponding ends of the cables 7 and 8, respectively, the forward movement of the cables 5 and 6 causes a corresponding rearward movement of the cables 7 and 8, as well as a like rearward movement of the left rudder pedal PL to which the cables 7 and 8 are connected. This displaced condition of the rudder pedals PR and PL, as moved by the pilot in his execution of a right turn maneuver, is clearly shown in Fig. 1.

The movement of the right rudder pedal PR by the pilot in the execution of a turn to the right imparts movement to the elements of the control system from their neutral positions as shown in Fig. 2 and indicated by the position letters "A" of the rudder surfaces in this figure, to the displaced positions of the elements as shown in Fig. 3, and to the displaced positions of the rudder surfaces indicated by the position letters "B" in Figs. 1 and 3. Accordingly, forward movement of the control cable 5 imparts counterclockwise movement to the quadrant 16 about its pivot causing movement of the push-pull rod 18 toward the right, as viewed by the reader, imparting clockwise movement to the lever element 20 about its pivot, and through the intermediacy of the link 22 causing the right rudder RR to be deflected in the counterclockwise direction about the pivot axis 24 to the position indicated at "B" in Fig. 3. It will be noted that as the cable 5 moves forwardly from the neutral position shown in Fig. 2 and the quadrant 16 is caused to move in the counterclockwise direction, the quadrant causes tensioning or pulling of the cable 7 about the sheave 14 thereby causing rearward movement of the forward portion of the cable 7 and the rudder pedal PL to which it is attached, together with the cable 8 extending to the left rudder.

Similarly, forward movement of the control cable 6 causes a like counterclockwise movement of the quadrant 17 about its pivot thereby moving the push-pull rod 19 to the right, as viewed by the reader, imparting clockwise rotation to the lever element 21 and corresponding movement of the link 23 to the right and the left rudder RL is also moved in a counterclockwise direction about its vertical hinge axis 25 into the deflected position "B". It will be noted, however, that while the right and left rudders RR and RL have both been moved or displaced in the same counterclockwise direction, the right rudder RR has been displaced on the order of six times the angular extent to which the left rudder LR has been displaced from their original neutral positions "A" as indicated in Fig. 2. In other words, as shown in Fig. 3, the right rudder has been displaced or rotated approximately 60°, and the left rudder has been displaced some 10°. This differential displacement, or difference in the angular extent to which the surfaces are rotated in the same counterclockwise direction, is created by the relationship of the cable actuating system to the quadrants 16 and 17, the push-pull rods 18 and 19, the lever elements 20 and 21, and the links 22 and 23 interconnecting the operating system with the rudder control surfaces.

It will be noted that, with the quadrant 16 in its neutral position shown in Fig. 2, a counterclockwise movement of the quadrant through a given angle will impart a much greater lateral displacement to the push-pull rod 18 than would a clockwise movement of the quadrant through the same angle. This may be clearly noted by comparing the movement of the pivotal connection between the quadrant 16 and the rod 18 from its neutral position in Fig. 2 as it is moved toward the axis of the airplane in Fig. 3; this being an appreciable lateral movement as compared to that of the corresponding pivot between the quadrant 17 and the rod 19 as it moved rearwardly in the counterclockwise direction from the neutral position in Fig. 2 to the displaced position in Fig. 3, the actual lateral movement in this case being relatively slight, the greatest movements being rearwardly or toward the trailing edge of the wing W.

This differential in movement of the elements of the control mechanism is augmented by the disposition of the triangular lever elements 20 and 21 such that as the large lateral displacement is imparted to the rod 18 by the quadrant 16 a similarly large increment is added to this displacement by the angular relationship of the lever element 20 with respect to the link 22 and its relatively large direct lateral pull of the link 22 causing a relatively large deflection of the right rudder surface RR. While this large movement is imparted to the right rudder by the quadrant 16 and the triangular lever element 20, a like movement of the control cable 6 and a similar angular movement of the quadrant 17 imparts but a slight lateral movement to the rod 19; and due to the angular position of the triangular link element 21 and the expenditure of its movement in the forward, rather than the outward lateral direction, causes a relatively small lateral outward displacement of the link 23 and the leading edge of the left rudder RL to which it is pivotally connected.

It will be obvious that to cause the airplane to be steered toward the left, as viewed by the pilot from the cockpit C, (to the reader's right) forward pressure on the left rudder pedal PL, causing rearward movement of the right rudder pedal PR, will cause the left rudder surface RL to be deflected outwardly to a much greater angular extent than the right rudder RR is deflected inwardly.

Figure 4:
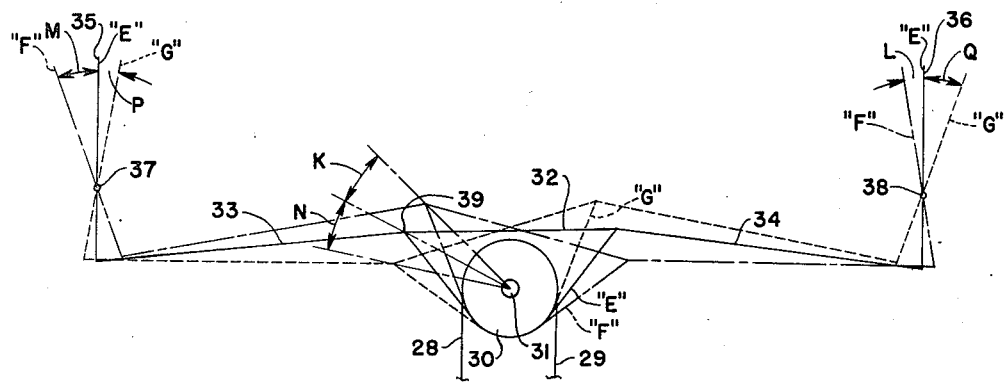
Fig. 4 is a further diagrammatic view of a modified operating system.

The manner in which the differential movement of the rudder surfaces is accomplished will also become apparent from the simplified operating mechanism shown in Fig. 4. In this figure, a single control cable is used, the right hand run of the cable 28 being connected to the right rudder pedal and the left hand run 29 being connected to the left rudder pedal. The aft portions of the cable runs 28 and 29 extend around, or are engaged with the groove of a sheave 30 pivoted at 31, for rotation upon a substantially vertical axis. Also mounted upon the pivot or shaft 31 such that it is arranged to rotate with the sheave 30 is a sector or lever element 32 having two rearwardly and outwardly extending triangular portions connected as by the pivotal connection 39 to the push-pull rods 33 and 34. The push-pull rod 33 is pivotally connected at its outer extremity to the leading edge portion of the right rudder 35 which is mounted for rotation about its substantially vertical pivot axis 37. The left push-pull rod 34 is similarly pivotally connected to the leading edge portion of the left rudder 36 which is similarly pivotally mounted for rotation about its hinge axis 38. The elements are shown in Fig. 4 in full lines for the neutral position indicated by the position letter "E," in dash-dot lines in the condition in which a turn would be made to the right as in the airplane of Fig. 1, this being indicated by the position letter "F" and when the turn is being made to the left or in the opposite direction, the elements are indicated by the dotted lines indicated by the position letter "G."

It will be noted that as the rudder pedals connected to the cables 28 and 29 are moved alternately to their extreme forward positions, the pivotal interconnection 39 is moved alternately to the rear or forward of its neutral position about the axis of the pivot 31 through the angles K and N, respectively. Accordingly, as the cable run 29 is moved forwardly, clockwise rotation is imparted to the sheave 30, about the pivot axis 31, and to the lever element 32, such that the pivotal connection 39 moves rearwardly and inwardly toward the center of the airplane. This imparts a similar inward lateral movement to the rod 33 which causes the right rudder 35 to be rotated in the counterclockwise direction about its pivot 37 through the relatively large angle M. Similarly, clockwise movement of the lever element 32 at the other side of the system causes forward and outward movement of the corresponding pivotal connection and the rod 34, causing similar displacement of the left rudder 36 from the neutral position "E" to the inwardly deflected position "F" through an angle L which is approximately one-half of the angle M through which the right rudder 35 was rotated to its deflected position "F."

Similarly, forward movement of the cable run 28 imparts counterclockwise rotation to the sheave 30, about its pivot 31, and to the link element 32, such that the pivot 39 moves forwardly and outwardly imparting similar movement to the rod 33 and causing rotation of the right rudder 35 into the inwardly deflected position "G" as indicated by the dotted lines and through the smaller angle "P." While the right rudder is being rotated inwardly through the smaller angle "P," the same movement of the rudder pedals and control cables causes an outward movement of the left rudder pedal 36 through the larger angle "Q" into the position indicated by the letter "G." It will be understood that the ratio between the angles P and M for given pedal displacements through the angles corresponding to angles K and N may be varied to suit the particular design or airplane by properly locating the relationship of the pivotal connections 39 and 31 with respect to the triangular link element 32, and to the push-pull rods 33 and 34. It will also be understood that whereas movement of the right rudder pedal in Fig. 1 caused the airplane to move to the right, that the cable runs 28 and 29 can be crossed such that the cable run 29 connects to the right rudder pedal, and vice versa, so that movement of the right rudder pedal in the system shown in Fig. 4 will have the same steering results as that shown in Fig. 1.

Figure 5:
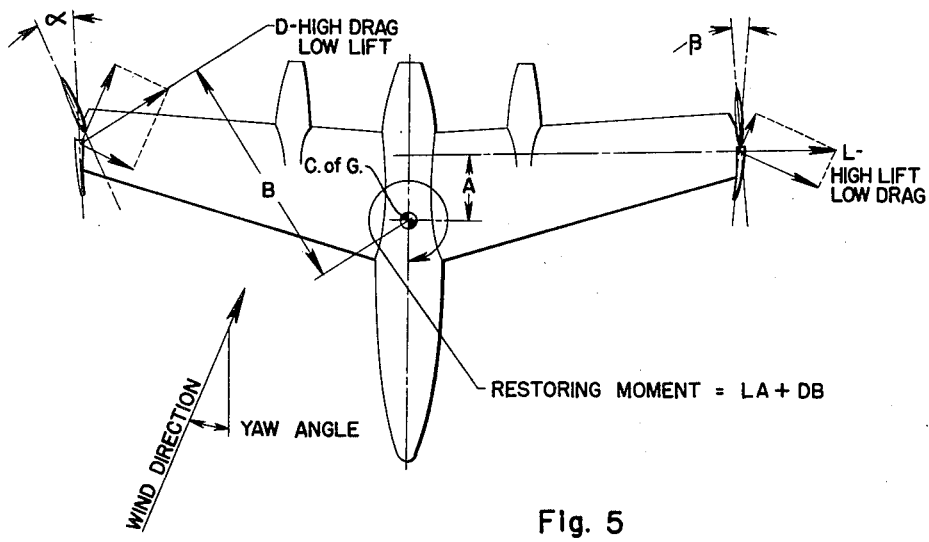
Fig. 5 is a diagrammatic plan view of a similar airplane embodying a modified form and "toed-in" disposition of surfaces.
Figure 6:
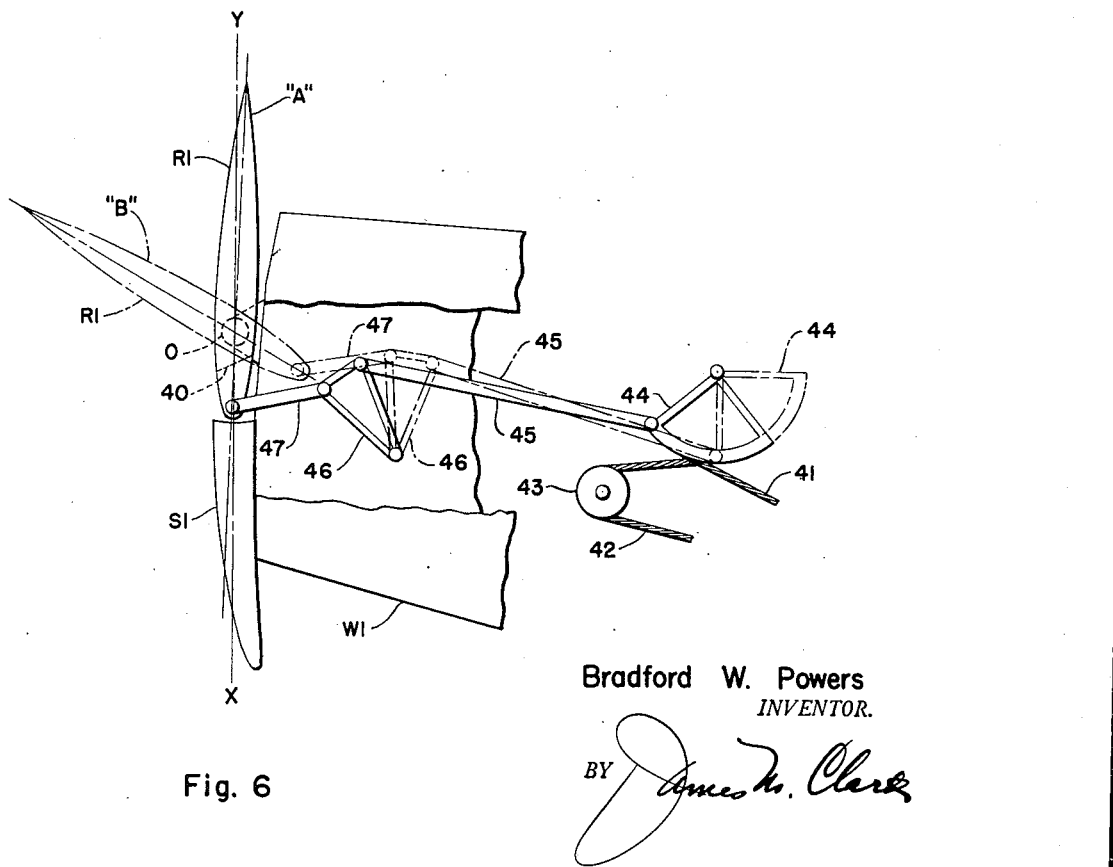
Fig. 6 is an enlarged plan view showing the modified form of a set of the movable and fixed surfaces and the associated operating mechanism.

In Fig. 5, there has been shown diagrammatically the forces exerted upon the airplane by deflection of the rudder surfaces into a displaced position in the same direction but to a somewhat lesser extent than shown in Fig. 1. In the preceding figures, symmetrical sections for the rudder and its associated fixed fin were employed in a disposition which was longitudinally arranged in the neutral condition. In Fig. 5, however, there is shown a cambered airfoil section at each wing tip which is disposed to converge forwardly or is "toed-in" slightly to provide the improved aerodynamic characteristics obtained by the present invention. The cambered airfoil section and its "toed-in" relationship is shown in greater detail in Fig. 6, and Fig. 5 shows diagrammatically the forces acting upon the airplane when it is caused to execute a right turn with the rudder deflections differentially set as indicated in this figure. With the right rudder deflected through the greater angle indicated as α, the air forces acting upon the resulting airfoil formed by the right rudder and its associated fixed fin by the relative wind exerted in a direction equivalent to the angle of yaw, imposes a relatively high drag and a relatively low lift on the right rudder combination. This creates a relatively high drag component D exerted through the arm B between the direction of the high drag-low lift vector and the center of gravity (C. G.) of the airplane, the resulting moment being equivalent to DB.

The rudder on the left side of the airplane being deflected inwardly through the lesser angle indicated as β at a positive angle of attack with respect to the relative wind, produces a relatively high lift component with relatively low drag, the resultant lift moment being indicated by the letter L, exerted transversely across the airplane, having a moment arm A and a resulting moment LA. The total effect of the forces acting upon both rudders accordingly becomes the restoring moment acting in the clockwise direction about the center of gravity (C. G.) of the airplane, the restoring moment being equivalent to LA plus DB.

In Fig. 6, there is shown the arrangement at the right wing tip whereby the improved results are obtained similar to those which have just been described. The wing W1 has fixedly carried upon its tip portion the cambered fixed fin surfaces S1 which is "toed-in" slightly with respect to the normal fore and aft axis X—Y. A rudder surface R1 having an airfoil section complementary to that of the fixed fin S1 is rotatably mounted for control movements about the vertical hinge axis O such that rudder R1 may be rotated by the differential mechanism described above from its neutral position "A" to its outwardly deflected position "B" for a right turn of the airplane, or to a lesser inwardly deflected position when the opposite rudder is deflected outwardly for a turn to the left. As in the case of the rudders shown in the earlier modification, the rudder R1 has a cut-out portion indicated at 40 to permit the leading portion of the rudder to clear the wing tip W1 when it is rotated into its deflected position. Its actuating mechanism is also similar to that of Figs. 2 and 3 and comprises the cables 41 and 42, the sheave 43, quadrant 44, rod 45, lever 46 and link 47 to the rudder R1. The "toed-in" relationship of the right rudder and its fin, as shown in Fig. 6, causes these combined surfaces to maintain a negative angle of attack in normal forward flight, and it has been found from actual experiments that this negative or "toed-in" attitude greatly augments the directional stability of the airplane. It is desirable, however, that a cambered section having a zero lift angle (minimum drag angle) be selected which is equivalent to the "toed-in" angle of the combined airfoils. It is to be understood that the present invention contemplates that symmetrical sections, such as have been shown in Figs. 1, 2 and 3, may be "toed-in" or converged with respect to their normal fore and aft axes, and the invention is not to be limited only to use of "toed-in" camber sections. Cambered sections, however, are to be preferred whenever sections with "toe-in" are contemplated for use because cambered sections provide somewhat less drag when "toed-in" than do symmetrical sections and have equal directional stability characteristics.

It will be obvious to those skilled in the art that the present improvements are applicable not only to the laterally spaced dual rudder surfaces of the tails or empennages of large airplanes, but as well to the tail rudders of conventional gliders, or to the wing tip rudders of tailless type gliders. It will also be apparent that many modifications with respect to the details of the elements which have been illustrated herein can be made both with respect to their relative positioning, the angles through which the elements and the control surfaces are rotated, or the ratio between the respective angles of rotation can be widely modified to suit specific installations. While the rudder surfaces have been shown and described at the wing tips they will operate equally well when spaced inwardly from the wing tips. They may be used with trim or servo tab surfaces and can be coordinated with the ailerons or other lateral control means. It will also be apparent to those skilled in the art that the actual profiles or airfoil sections of the respective surfaces can be modified to suit varying conditions and that all such modifications are intended to come within the scope and spirit of the present invention as more particularly set forth in the appended claims.

I claim:

1. In an aircraft, a pair of laterally spaced control surfaces adapted to be operated simultaneously to initiate a flight control movement of the aircraft about one of its maneuver axes, a control element mounted within the aircraft for rotation about a pivot axis, means operatively connected to the control element adapted to move it in rotation about its pivot in either direction from a neutral reference point, respective operative connections carried by the control element adapted to provide simultaneous movement of each control surface in the same direction, the said connections being disposed on the control element to follow a curvilinear path upon actuation thereof and operating linkages joining the said connections to the respective control surfaces, the said connections being further characterized by having an established spatial relationship with respect to each other and the pivot axis whereby the two connections and the pivot form the apices of a triangle such that as said control element is moved in one direction or the other from neutral both control surfaces will be moved in the same direction but the linear components of the rotational movement of the control element transmitted through the said linkages will be of unequal magnitude causing one of said control surfaces to assume an effective control position differing from that of the other, the angles of deflection of the respective control surfaces being inversely proportional to their relative distances from the maneuver axis.

2. In an aircraft, a combination of a pair of yaw control surfaces mounted for rotation about separate axes disposed in parallelism to the yaw axes, a control element mounted within the aircraft for rotation about an axis, means operatively connected to the control element adapted to move it in rotation about its axis in either direction from a neutral reference point, operating connection means associated with the control element adapted to provide for actuation of each control surface simultaneously in the same direction through angles of unequal magnitude, the said connection means being operatively influenced by rotation of the control element to follow a curvilinear path and operating linkages joining the said connection means to the respective control surfaces, the said connection means being further characterized by having an established spatial relationship with respect to the neutral reference point such that as said control element is moved in one direction or the other from neutral, the linear components of the rotational movement of the control element transmitted through the said linkages will cause simultaneous movement of the control surfaces of unequal magnitude, with that yaw control surface nearest the axis of yaw moving through the larger angular range.

3. The combination in an aircraft control system of a pair of pivotally mounted, laterally disposed control surfaces, a pair of pilot operable control means operable selectively for the purpose of producing different combinations of flight control movements of the two surfaces acting concurrently as a pair, and means including a variable transmission linkage operatively connected to the said pilot operable control means and to each of the said control surfaces, the said variable transmission linkage having a neutral position corresponding to the unoperated positions of the pair of pilot operable control means and being adapted upon displacement from its neutral position to transmit the movements of either of the control means to both control surfaces in different proportion by transmitting a decreasing proportion of the control movement to one surface of the pair while at the same time transmitting an increasing proportion to the other surface so that the surfaces will be moved simultaneously in the same direction but one will move through a greater angular range than the other dependent upon which control means has been operated.

4. In a control system for an aircraft, laterally spaced rudder surfaces movably carried by the aircraft, a rudder actuating instrumentality, a differential actuating mechanism interconnecting the said instrumentality with one of said rudder surfaces, a second differential actuating mechanism interconnecting said instrumentality with another of said rudder surfaces, said differential actuating mechanisms each including a pivotally mounted quadrant connected to the rudder actuating instrumentality by linkage adapted to actuate the quadrants simultaneously in the same rotational direction to equal angular extent, operating push-pull links extending from each quadrant to its associated control surface, and connections by which the links are adapted to be attached to their respective quadrants at respective points thereon selected such that the linear components of the rotational motion of the quadrants imparted to the links will, for one direction of rotation of the quadrants, increase in magnitude in the case of one rudder and decrease in magnitude in the case of the other whereby simultaneous deflections of the rudder surfaces will occur in the same direction but to different angular extents.

5. In an airplane intended to be steered along a curvilinear path about a reference point remotely located exteriorly of the body of the airplane, the combination of a sustaining surface, a pair of yaw control surfaces mounted on the sustaining surface adjacent the tips thereof such that in yawing flight one of said surfaces will follow a path of greater curvature than the other, a pilot operated control member movable from a neutral position in either of two control directions for the purpose of steering the airplane in yaw in one direction or the other, means operatively connecting the pilot operated control member to the individual yaw control surfaces so that they will respond to movements thereof by moving simultaneously in the same direction but to different degree, the said means including a variable ratio motion transmitting unit adapted, when receiving motion from the said control member as it is moved in one or the other of its control directions to steer the airplane in yaw, to transmit an increasing proportion of the motion of the control members to that control surface closest to the reference point and a decreasing proportion of the motion of the control member to that control surface more remote from the reference point.

6. In a tailless airplane, the combination of a main sustaining surface, a pair of flight control surfaces mounted thereon adjacent the outboard ends of the sustaining surface, a pilot operated control movable in two directions from a neutral position adapted to operate the flight control surfaces simultaneously in the same direction to either side of a neutral position, force transmission means of branched type extending from the pilot operated control to the respective flight control surfaces, a variable ratio movement transmission means operatively inserted in that branch of the force transmission means leading to a first one of said flight control surfaces adapted to transmit a decreasing proportion of the movement of the pilot operated control when the same is moved in a first one of the directions and adapted to transmit an increasing proportion of the movement of the pilot operated control when the same is moved in the other of said directions, and a second variable ratio transmission means operatively connected in the other branch of the force transmission means leading to a second of said flight control surfaces adapted to transmit an increasing proportion of the movement of the pilot operated control when the same is moved in the first one of the said directions and to transmit a decreasing proportion of the movement of the pilot operated control when the same is moved in the other of the said directions whereby when said pilot operated control is moved in either direction from neutral, one of said flight control surfaces will be moved through a greater angular range than the other.

References Cited in the file of this patent

UNITED STATES PATENTS

| Number | Name | Date |
| --- | --- | --- |
| 1,759,442 | Depew | May 20, 1930 |
| 1,774,024 | Lobelle | Aug. 26, 1930 |
| 2,337,706 | Berry | Dec. 28, 1943 |
| 2,340,237 | Upson | Jan. 25, 1944 |
| 2,390,939 | Huff | Dec. 11, 1945 |
| 2,393,444 | Zap | Jan. 22, 1946 |
| 2,454,981 | Vint | Nov. 30, 1948 |
| 2,595,363 | Lee | May 6, 1952 |

FOREIGN PATENTS

| Number | Country | Date |
| --- | --- | --- |
| 324,075 | Germany | Aug. 24, 1920 |
| 412,683 | France | May 9, 1910 |

OTHER REFERENCES

"Aircraft Engineering," April 1945, pp. 107–109 incl.